United States Patent
Gabryszewski et al.

[11] Patent Number: 5,238,468
[45] Date of Patent: Aug. 24, 1993

[54] COLLECTION DEVICE FOR GASEOUS EMISSIONS

[75] Inventors: Gregory J. Gabryszewski, Lithonia; William S. Blair, Jr., Lawrenceville, both of Ga.

[73] Assignee: Nordson Corporation, Westlake, Ohio

[21] Appl. No.: 746,923

[22] Filed: Aug. 19, 1991

[51] Int. Cl.$^5$ .............................. B01D 45/00
[52] U.S. Cl. ........................ 95/267; 55/437; 55/467; 454/49; 454/67; 95/291
[58] Field of Search ........... 454/49, 67; 55/467, 55/1, 437; 118/326

[56] References Cited

U.S. PATENT DOCUMENTS

| | | | |
|---|---|---|---|
| 2,190,068 | 2/1940 | Henschler | 454/49 |
| 2,247,891 | 7/1941 | Schneible | 454/54 |
| 2,247,892 | 7/1941 | Schneible | 454/67 |
| 2,942,540 | 6/1960 | Lundy | 454/49 |
| 3,564,990 | 2/1971 | Smedes | 454/67 |
| 3,585,361 | 6/1971 | Rosen et al. | 219/421 |
| 3,964,645 | 6/1976 | Scholl | 222/146 HE |
| 3,981,416 | 9/1976 | Scholl | 222/146 R |
| 4,023,943 | 5/1977 | Kipple et al. | 55/467 |
| 4,456,151 | 6/1984 | Lewellen | 222/146 HE |
| 4,474,311 | 10/1984 | Petrecca | 222/146.5 |
| 4,485,941 | 12/1984 | Frates et al. | 222/146.5 |
| 4,632,277 | 12/1986 | Pallante | 222/146.2 |
| 4,661,688 | 4/1987 | Gabryszewski | 219/421 |
| 4,666,066 | 5/1987 | Boccagno et al. | 222/146.5 |
| 4,667,850 | 5/1987 | Scholl et al. | 222/23 |
| 4,771,920 | 9/1988 | Boccagno et al. | 222/146.5 |
| 4,790,455 | 12/1988 | Dieringer et al. | 222/146.2 |
| 4,821,922 | 4/1989 | Miller et al. | 222/77 |
| 4,883,200 | 11/1989 | Miller et al. | 222/77 |

FOREIGN PATENT DOCUMENTS

| | | |
|---|---|---|
| 1148368 | 5/1963 | Fed. Rep. of Germany . |
| 3901859 | 7/1990 | Fed. Rep. of Germany ........ 454/49 |
| 854147 | 11/1990 | United Kingdom . |

Primary Examiner—Bernard Nozick
Attorney, Agent, or Firm—Wood, Herron & Evans

[57] ABSTRACT

A collection device (10) for gaseous emissions which comprises a collector body (20) having a hollow interior (33) and an inner wall (22) shaped to conform to a portion of the outer periphery of the open top (14) of a material supply container (12). The inner wall is formed with a number of inlet openings (40, 42) communicating with the collector body interior which are spaced from one another in a direction from one end of the collector body to the other. A deflector member or strake (46) is mounted to the inner wall of the collector body in the areas between adjacent inlet openings therein, and lips are mounted at the top (34) and bottom (35) of the collector body which extends outwardly therefrom substantially perpendicular to the inner wall of the collector body.

20 Claims, 2 Drawing Sheets

COLLECTION DEVICE FOR GASEOUS EMISSIONS

FIELD OF THE INVENTION

This invention relates to collection devices, and, more particularly, devices for the collection of gaseous emissions discharged from the open top of hoppers or containers used to supply coating materials, adhesives and other materials.

BACKGROUND OF THE INVENTION

One type of adhesive container for supplying molten hot melt thermoplastic adhesive to dispensing devices comprises a cylindrical-shaped hopper or container in which a heated feed ram is axially movable to force the hot melt adhesive through a discharge outlet in the container to one or more dispensing devices. The feed ram is moved axially downwardly within the adhesive container until a predetermined quantity of adhesive is discharged therefrom, at which time the ram is withdrawn to expose the open top of the container and permit loading of more adhesive for heating and subsequent discharge from the container.

In the course of discharge of adhesive from the container, or while the ram is removed from the container to permit loading of additional adhesive, fumes in the form of gaseous emissions are released from the heated adhesive and flow upwardly toward the open top of the container. It is important to collect these gaseous emissions before they escape to atmosphere.

Fume collection devices have been utilized in the past to collect fumes emitted from adhesive supply containers, but these devices are of limited effectiveness. Typically, fume collection devices are connected to a source of vacuum which draws ambient air surrounding the container toward inlet openings in the collection device so that the gaseous emissions from the interior of the container are entrained within such air flow and drawn through the inlet openings into the collection device. One problem with collection devices of this type is that turbulence is usually created in such air flow, particularly as the air enters the inlet openings of the collection device, which reduces the effectiveness of the emission recovery operation. Additionally, an unacceptable amount of gaseous emissions can escape upwardly from the open top of the container in the immediate area of the collection device before they become entrained in the flow of air entering the collection device.

The same problems identified above in connection with adhesive supply containers are also present in containers for the supply of other material such as coating compositions. In the coating and finishing industry, for example, a major concern is the environmental effect of the escape of solvent components of paint. Using collection devices of the type described above, it has been found that the solvents present in paint are often ineffectively captured as they evaporate and escape as gaseous emissions from the paint formulation, resulting in contamination of the surrounding atmosphere. Additionally, since most solvents react with oxidants, pollution problems of toxicity, odor and smog may be created as a result of the ineffective recovery of gaseous solvents escaping from the coating formulation.

SUMMARY OF THE INVENTION

It is therefore among the objectives of this invention to provide a collection device for recovering gaseous emissions from containers supplying adhesive, coating formulations or other materials which substantially reduces the escape of gaseous emissions from the container, which protects the operator of the equipment and the atmosphere from exposure to emissions, which is relatively inexpensive to construct and which can be adapted for use with containers of different configuration.

These objectives are accomplished in a collection device for gaseous emissions which comprises a collector body having an inner wall, an outer wall, top and bottom walls and opposed end walls which collectively define a hollow interior. The inner wall is shaped to conform to a portion of the outer periphery of the open top of a material supply container, and is formed with a number of inlet openings communicating with the collector body interior which are spaced from one another in a direction from one end of the collector body to the other. A deflector member or strake is mounted to the inner wall of the collector body in the areas between adjacent inlet openings therein. A first plate or lip is mounted at the top wall of the collector body and a second plate is mounted at the bottom wall thereof, both of which extend outwardly from the collector body substantially perpendicular to its inner wall.

One aspect of this invention is predicated upon the concept of creating a substantially laminar air flow across the open top surface of the material supply container and into the inlet openings in the collector body so that gaseous emissions from the interior of the container are effectively entrained within such air flow and drawn into the collector body for removal. In the presently preferred embodiment, the collector body has an outlet adapted to connect to a vacuum source which creates a negative pressure within the interior of the collector body. Preferably, the collector body is mounted along a portion of the periphery of the open top of the container so that a flow of air from the opposite side of the container is drawn toward the collector body across the open top of the container. In order to create a laminar flow of air into the inlet openings of the collector body, the deflector members or strakes between adjacent inlet openings are each formed with a leading edge spaced from the inner wall of the collector body, and a pair of tapered side walls which extend from the leading edge toward the inlet openings in the inner wall of the collector body. As the air flow generated by the negative pressure within the collector body draws air toward its inlet openings, the air is deflected away from the spaces in between adjacent inlet openings by the tapered walls of the strake without creating areas of turbulence therebetween. As a result, a smooth, laminar flow of air is developed across the open top of the container within which gaseous emissions from the container interior are entrained and smoothly guided into the inlet openings of the collector body for disposal.

In another aspect of this invention, it has been observed that a portion of the gaseous emissions drawn toward the collector body impact against its inner wall and deflect upwardly, in a direction away from the container. These upwardly deflected emissions could escape to atmosphere before being drawn into the interior of the collector body. This problem is avoided in the collection device of this invention by the provision of the outwardly extending plate or lip connected at the top wall of the collector body and extending outwardly therefrom substantially perpendicular to the inner wall of the collector body. In this position, the plate or lip is located in the path of gaseous emissions deflected upwardly from the inner wall of the collector body and is effective to deflect such gaseous emissions downwardly toward the flow of air entering the inlet openings of the collector body. At least some rotational air flow is generated by this deflected flow of gaseous emissions, but such rotational air flow is minimal and does not disrupt the laminar air flow into the inlet openings produced by the strakes as described above.

In a still further aspect of this invention, one presently preferred embodiment of this invention is particularly adapted for use with adhesive supply containers of the type having a feed ram which moves axially within the interior of the adhesive container and forces molten thermoplastic adhesive from a discharge outlet to one or more adhesive dispensers. Upon removal of this feed ram from the interior of the container for cleaning, or to add additional adhesive into the container, the open top of the container is exposed and gaseous emissions from the container interior can escape.

It has proven difficult to collect gaseous emissions if they are allowed to escape to the area above the ram after it has been removed from the container interior. This problem is overcome, in part, by an alternative design of the deflector members or strakes mounted to the inner wall of the collector body. In this embodiment, the leading edge of each strake is angled inwardly toward the inner wall of the collector body from a point near the top wall toward the bottom wall thereof. This configuration of the strake produces a larger gap between the bottom of the strake and the ram associated with the adhesive container, than at the top of the strake. As a result, less resistance to the air flow across the top of the container is produced beneath the ram, i.e., where the space between the ram and strake is greatest, so that a greater flow rate of air is induced in the area below the ram than in the area above the ram. In addition to the strake configuration, the plate or lip mounted at the top wall of the collector body extends nearly into engagement with the ram when it is withdrawn from the adhesive container thus forming an upper barrier to block the escape of gaseous emissions upwardly from the collector body. These features of this invention improve the efficiency of collection of gaseous emissions in the particular application of an adhesive container having a discharge ram.

One additional feature of this invention which is common to each of the embodiments described above involves the location of the inlet openings of the collector body with respect to the peripheral edge of the open top of the container. Assuming the container is cylindrical, for example, the collector body is preferably positioned along an arc or portion of the outer periphery of the open top of the container which is less than about 180°. The inlet openings formed in the inner wall of the collector body are spaced from one another, and extend between the end walls of the collector body. Application of a negative pressure within the interior of the collector body therefore creates an air flow across the open top of the container in which ambient air is directed radially inwardly from the periphery of the container top, and areas exteriorly thereof, toward the inlet openings in the collector body. This inwardly directed or diverging air flow is effective to entrain and confine gaseous emissions within the boundary of the periphery of the open top of the container which substantially eliminates the escape of such emissions to atmosphere.

DESCRIPTION OF THE DRAWINGS

The structure, operation and advantages of the presently preferred embodiment of this invention will become further apparent upon consideration of the following description taken in conjunction with the accompanying drawings, wherein.

DETAILED DESCRIPTION OF THE INVENTION

Figure 1:
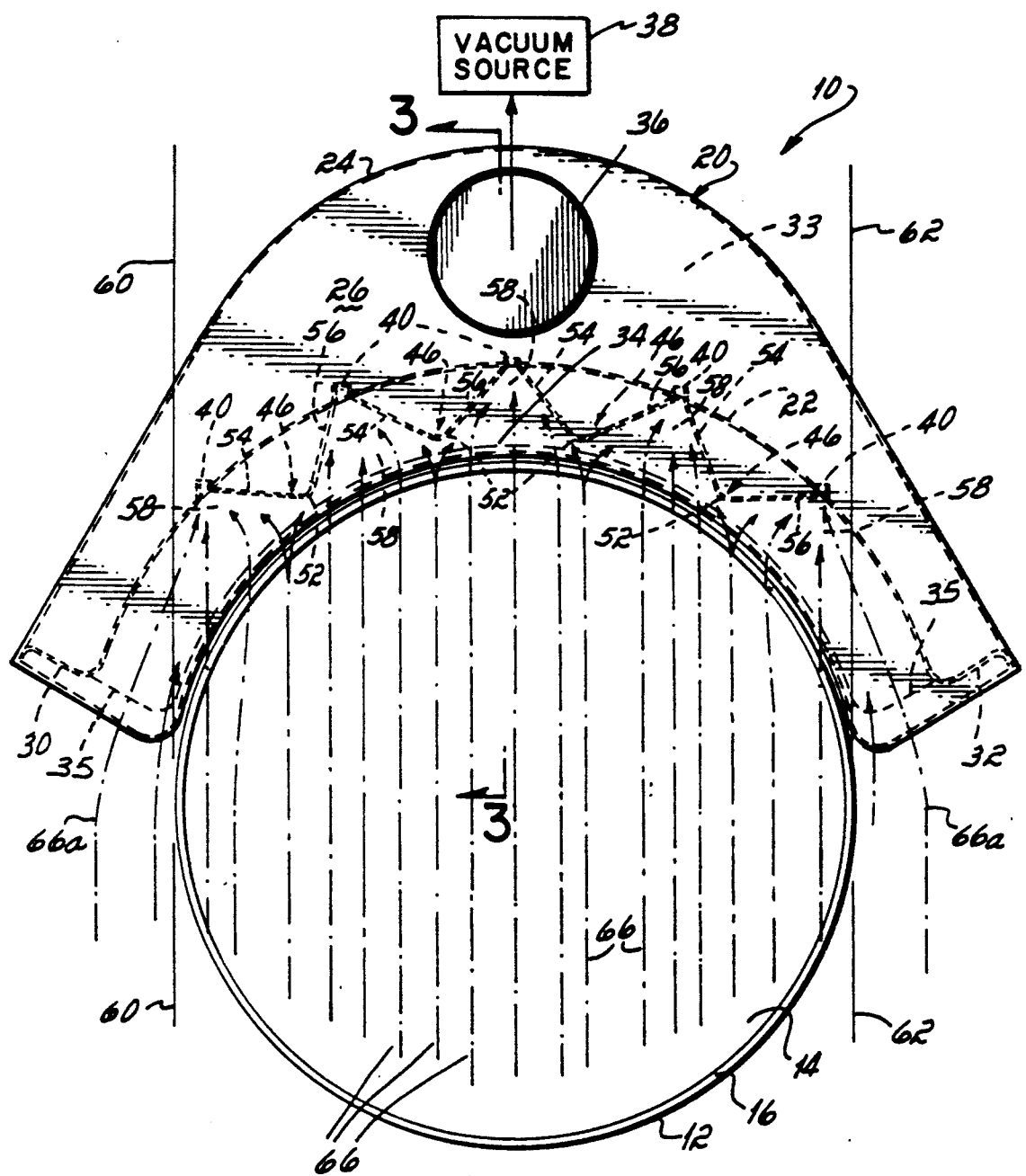
FIG. 1 is a plan view of a cylindrical container with the collection device of this invention mounted adjacent thereto and wherein the arrows depict the air flow path across the open top of the container.

Referring now to the Figs., a collection device 10 is illustrated for use in the particular application of capturing the gaseous emissions from a cylindrical-shaped container 12 having an open top 14 formed with a peripheral edge 16. For purposes of the present discussion, the container 12 is assumed to be an adhesive supply container for discharging molten thermoplastic hot melt adhesive to one or more dispensers (not shown) in which a feed ram 18 is axially movable within the interior of the container 12 to force adhesive therefrom to the dispensers. The collection device 10 is utilized to capture gaseous emissions which escape from the interior of container 12 while the ram 18 is moved downwardly to discharge adhesive therefrom, and when the ram 18 is removed from the container 12 to load in new adhesive. See FIG. 3. It should be understood, however, that the collection device 10 of this invention can be adapted for use with containers of essentially any configuration, e.g., square or other shapes, and with containers intended to hold or supply other types of materials such as liquid coating compositions.

In the presently preferred embodiment, the collection device 10 comprises a collector body 20 having an inner wall 22, outer wall 24, top wall 26, bottom wall 28, and opposed end walls 30, 32 which collectively define a hollow interior 33. An upper deflector member or lip 34 is mounted at or near the top wall 26 and extends outwardly therefrom substantially perpendicular to the inner wall 22. A lower lip 35 is mounted to the bottom wall 28 of collector body 20, which extends substantially parallel to the upper lip 34. An outlet line 36 is mounted to the top wall 26 of the collector body 20 and is adapted to connect to a vacuum source 38 depicted schematically in FIG. 1.

Figure 3:
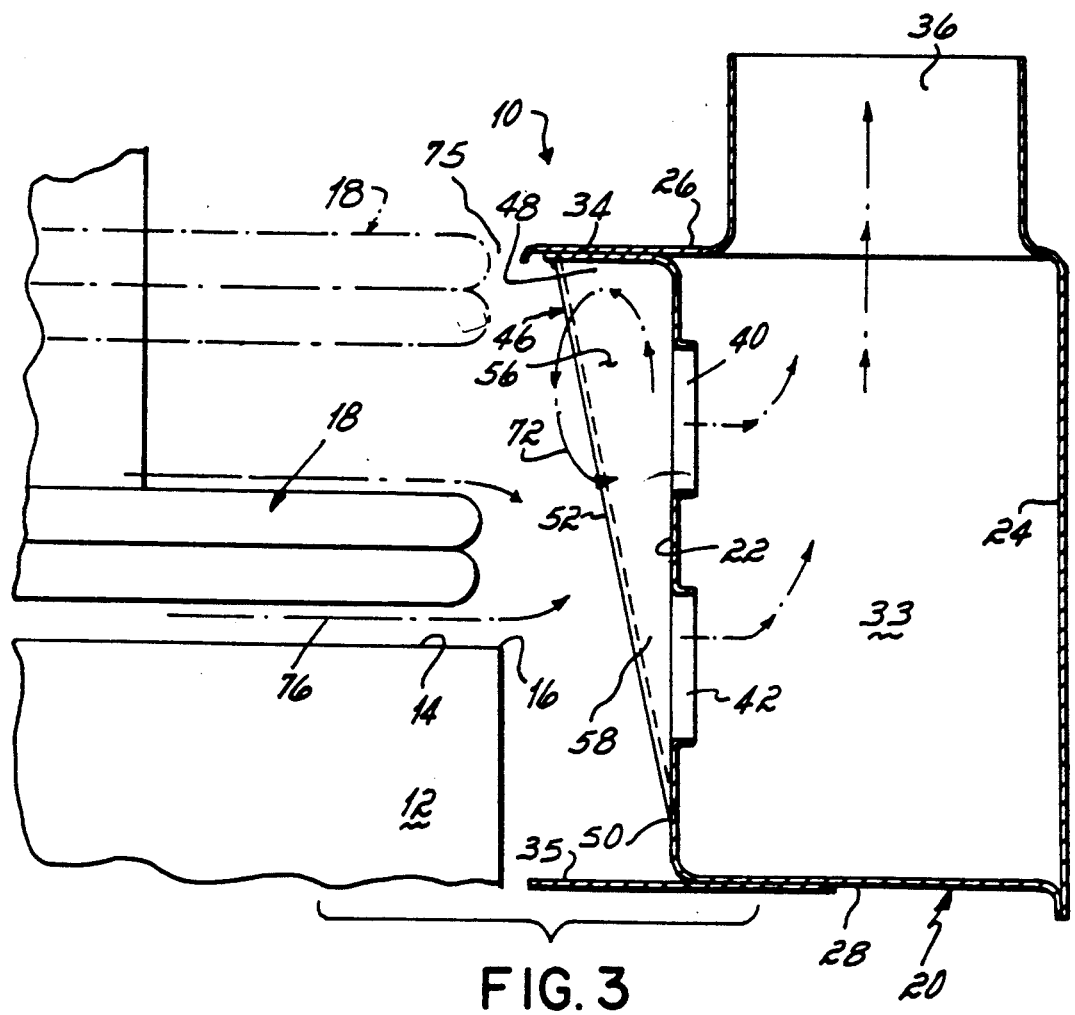
FIG. 3 is a cross sectional view taken on line 3—3 of FIG. 1 which is illustrated with an adhesive supply container having a feed ram.

As best shown in FIG. 1, the inner wall 22 of collector body 20 is formed in an arc which substantially conforms in shape to a portion of the peripheral edge 16 of the open top 14 of the cylindrical container 12. Preferably, the inner wall 22 extends less than about 180° around the peripheral edge 16 for purposes to become apparent below. The inner wall 22 is formed with a number of pairs of inlet openings, each pair including an upper inlet opening 40 and lower inlet opening 42 which are spaced in vertical alignment with one another between the top and bottom walls 26, 28 of the collector body 20. As shown in FIG. 3, the lower inlet openings 42 are preferably located near the top 14 of the container 12 and the upper inlet openings 40 are positioned near the underside of the ram 18 in its extended position shown in phantom in FIG. 3. These pairs of upper and lower inlet openings 40, 42 are also spaced from one another in a direction extending between the opposed end walls 30, 32 of collector body 20 thus forming a series of open areas 44 along the inner wall 22 therebetween. In the particular embodiment illustrated in the Figs., there are five pairs of upper and lower inlet openings 40, 42 which form four open areas 44 therebetween.

Figure 2:
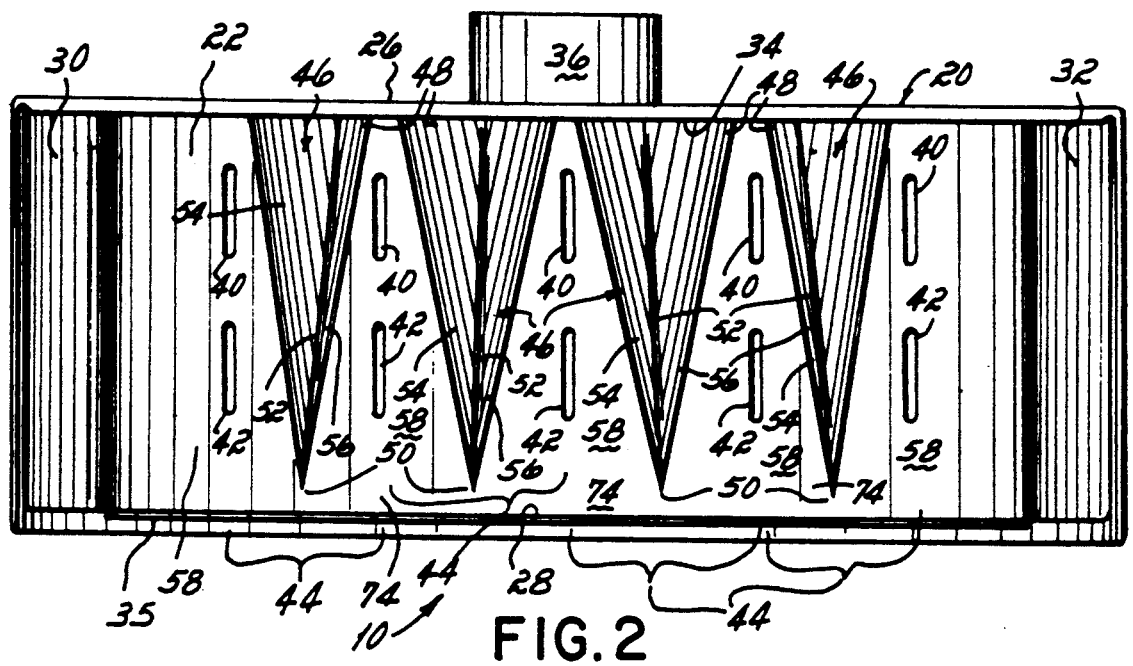
FIG. 2 is a front view of the collection device of FIG. 1.

An important aspect of this invention is the provision of means within the open areas 44 between adjacent pairs of inlet openings 40, 42 for providing a laminar air flow into the inlet openings 40, 42. As shown in FIGS. 1 and 2, a deflector member or strake 46 is formed on the inner wall 22 of collector body 20 in each of the open areas 44 between adjacent pairs of upper and lower inlet openings 40, 42. Each of these strakes 46 includes a wider, base portion 48 located near the top wall 26 of collector body 20, and a narrower lower or apex portion 50 located near the bottom wall 28 of collector body 20 which preferably extends below the open top 14 of the container 12, e.g., on the order of about one-half inch below, as shown in FIG. 3. In one presently preferred embodiment, each strake 46 has a leading edge 52 which projects outwardly from the inner wall 22, but tapers from the base portion 48 of strake 46 at the top wall 26 of collector body 20 inwardly to the apex portion 50 thereof near the bottom wall 28 of collector body 20. See FIG. 3. Preferably, the leading edge 52 of each strake 26 is connected to a pair of side walls 54 and 56, each of which taper inwardly from the leading edge 52 to the inner wall 22 of collector body 20.

As discussed in more detail below, the purpose of the strakes 26 is to smoothly direct air-entrained gaseous emissions from the container 12 into the inlet openings 40, 42. To that end, the leading edge 52 of each strake 26 formed by the intersection of side walls 54, 56 is preferably relatively sharply defined instead of being curved or rounded. It has been found that a sharp, well-defined edge 52 is more aerodynamic than a rounded edge and directs the air flow into openings 40, 42 with less disruption. Preferably, the leading edge 52 of each strake 26 therefore has a radius of about one-eighth inch or less.

As illustrated in FIGS. 1 and 2, each strake 46 is positioned within an open area 44 between adjacent pairs of inlet openings 40, 42 such that the leading edge 52 of each strake 46 is located approximately at the midpoint between adjacent pairs of inlet openings 40, 42. Because the strakes 46 taper inwardly from their base portion 48 to the apex 50, adjacent strakes 46 form an essentially triangular-shaped inlet area 58 on the inner wall 22 of collector body 20 within which a separate pair of upper and lower inlet openings 40, 42 is positioned.

As viewed in FIGS. 1 and 3, the collection device 10 is preferably mounted adjacent the peripheral edge 16 of the open top 14 of container 12 such that the bottom wall 28 of collector body 20 extends at least partially beneath the plane of the container top 14 while the remainder of the collector body 20 is positioned above the container top 14. Additionally, as mentioned above, the arc length of the inner wall 22 of collector body 20 is preferably less than about 180° so that the collector body 20 extends only partially along the peripheral edge 16 of the container top 14. In the presently preferred embodiment, each pair of upper and lower inlet openings 40, 42 are positioned along the inner wall 22 of collector body 20 within an area defined by a pair of lines 60 and 62 which are tangent to the peripheral edge 16 of the container top 14 and parallel to one another. The space or distance between these parallel, tangent lines 60, 62 is equal to the diameter of the container top 14, and each of the pairs of upper and lower inlet openings 40, 42 are positioned along the inner wall 22 within or inside of such space.

OPERATION OF COLLECTION DEVICE

As mentioned above, the purpose of the collection device 10 is to capture gaseous emissions which escape from the open top 14 of container 12. A number of the structural features of collection device 10 described above contribute to its effectiveness in substantially preventing the release of gaseous emissions to atmosphere.

The vacuum source 38 is effective to create a negative pressure within the hollow interior 33 of collector body 20 which draws a flow of ambient air into each pair of upper and lower inlet openings 40, 42 along the inner wall 22 of collector body 20. This air flow is represented by the arrows 66 in FIG. 1. The gaseous emissions escaping from the open top 14 of container 12 are entrained within this air flow 66 and drawn into the hollow interior 3 of collector body 20 and then through the outlet line 36 to a recovery device (not shown).

One feature of this invention which contributes to the effectiveness of collection device 10 is the positioning of the pairs of upper and lower inlet openings 40, 42 along the inner wall 22 of collector body 20. As mentioned above, all of the pairs of upper and lower inlet openings 40, 42 are preferably located within the area or space between the tangent lines 60, 62. As a result, the air flow 66 across the open top 14 of container 12 is caused to converge inwardly from areas exteriorly of the peripheral edge 16 of open top 14 to the inwardly positioned pairs of inlet openings 40, 42 within the collector body 20. See arrows 66a in FIG. 1. This converging flow of ambient air from outside of the container top 14 inwardly ensures that the gaseous emissions escaping from the container 12, even at its peripheral edge 16, are entrained within the air flow and drawn into the collector body 20. The lower lip 35 mounted to the bottom wall 28 of collector body 20 extends nearly into contact with the container 20 and forms a barrier to substantially prevent the flow of outside air from the area beneath the collector body 20, and along the side wall of container 12, upwardly toward the inlet openings 42, 44. Such upwardly moving air flow could disrupt the air flow 66 across the top 14 of container 12 and result in the escape of some gaseous emissions.

Another important structural feature of this invention which ensures efficient collection of gaseous emissions from container 12 is the strakes 46 located in the areas 44 between adjacent pairs of upper and lower inlet openings 40, 42. As schematically depicted in FIG. 1, the strakes 46 are effective to deflect the air flow 66 directly and smoothly to the inlet areas 58 along inner wall 22 of collector body 20 and into the pairs of inlet openings 40, 42 thereat, thus inducing a laminar flow of air as it moves into the inlet openings 40, 42. The leading edge 52 and tapered side walls 54, 56 of each strake 46 divide the air flow directed into the inlet areas 58 and smoothly guide such air flow directly into the inlet openings 40, 42. By inducing a laminar air flow and substantially preventing turbulence as the air approaches the inner wall 22 of collector body 20, the velocity of the air flow is maintained in the course of movement into the inlet openings 40, 42 which substantially prevents the gaseous emissions entrained within such air flow escaping to atmosphere.

As mentioned above, the presently preferred embodiment of collection device 10 includes an upper lip 34 extending outwardly from the top wall 26 of collector body 20 generally perpendicular to the inner wall 22 thereof. It has been found that a portion of the gaseous emissions drawn by the air flow 66 toward the inlet openings 40, 42 impacts against the inner wall 22 of collector body 20 at the inlet areas 58 and is deflected upwardly, in a direction away from the container top 14, forming a rotating air flow as depicted by the arrows 72 in FIG. 3. The upper lip 34 is positioned in the path of such gaseous emissions 72 and functions to deflect them downwardly toward the main air flow entering the collector body 20. These downwardly deflected gaseous emissions 72 are thus forced into the stream of air entering the pairs of inlet openings 40, 42 and are prevented from escaping to atmosphere. While such deflection of gaseous emissions creates at least some rotational flow, it has been found that the amount of such rotational flow is minimal and does not affect the smooth, laminar flow of the air into the inlet openings 40, 42 provided by the strakes 46 as discussed above.

In the embodiment of this invention illustrated in FIG. 3, the container 12 includes a feed ram 18 operative to move into the interior of container 12 to discharge molten thermoplastic adhesive therefrom, and then to move outside of the container 12 to permit loading of new adhesive therein. Escape of gaseous emissions from the container interior is a particular problem during the adhesive loading operation, i.e., when the ram 18 is withdrawn from the container 12 and reaches a fully extended position as shown in phantom lines in FIG. 3.

In order to ensure that gaseous emissions are captured during this adhesive loading procedure, each strake 46 is provided with a tapered leading edge 52 of the type described above. As shown in FIG. 3, the leading edge 52 of each strake 46 tapers inwardly from the top wall 26 of collector body 20 toward the bottom wall 28 thus forming a larger space or gap 74 between each strake 46 and the ram 18 near the bottom of ram 18 than near its top. This larger gap 74 near the bottom of ram 18 induces a greater air flow therealong, as represented by arrows 76, because such larger gap 74 offers less resistance to air flow than the relatively small space 75 between the top of strake 46 and the top of ram 18. As a result substantially all of the air flowing across the open top 14 of container 12, with the ram 18 removed therefrom as shown in phantom in FIG. 3, passes between the bottom of ram 18 and the container top and then upwardly into the inlet openings 40, 42 in the inner wall 22 of collector body 20. The lower inlet openings 42 are located near the top 14 of container 12 in a position to receive gaseous emissions passing underneath the ram 18 when it is being initially withdrawn from or inserted into the container 12. The upper inlet openings 40 are located near the top wall 26 of collector body 20 in position to withdraw emissions from beneath the ram 18 with the ram 18 in its fully extended position, shown in phantom in FIG. 3. The configuration of strakes 46, and positioning of inlet openings 40, 42, thus ensure that the gaseous emissions from container 12 are entrained within the air flow and not lost to atmosphere.

While the invention has been described with reference to a preferred embodiment, it should be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

For example, strakes 46 each having an inwardly tapered leading edge 52 are illustrated in the Figs. which are particularly adapted for use with an adhesive container 12 having a ram 18. It is contemplated, however, that a container without a ram 18, e.g., having an open top and/or removable lid, would not require the use of strakes 46 having a tapered leading edge 52. The strakes utilized with the collection device 10 for that application would preferably have a leading edge substantially parallel to the inner wall 22 of collector body 20.

Additionally, the shape of the inner wall 22 of collector body 20 is illustrated in the Figs. as an arc for use with a cylindrical container 12. It should be understood that the inner wall 22 could have essentially any shape so long as it generally conforms to the shape of the peripheral edge of the open top of a given container.

As best shown in FIG. 2, the preferred embodiment of this invention includes pairs of vertically spaced inlet openings 40, 42 formed in the inner wall 22 of collector body 12. It should be understood, however, that a single elongated slot or more than two slots could be utilized, and are considered within the scope of this invention, so long as one slot or a portion thereof extends at least partially below the open top 14 of container 12 and another slot or a portion thereof extends near the bottom of ram 18 in its fully extended position.

It should also be understood that while the inlet openings 40, 42 are located along inner wall 22 of collector body 20 between the tangent lines 60, 62 depicted in FIG. 1, it is contemplated that such tangent lines could extend inwardly therefrom, coincident with the centers of the outermost inlet openings 40, 42 in collector body 20.

Therefore, it is intended that the invention not be limited to the particular embodiment disclosed as the best mode contemplated for carrying out this invention, but that the invention will include all embodiments falling within the scope of the appended claims.

It is claimed:

1. The method of collecting gaseous emissions from a container, comprising:
   creating a substantially laminar flow of air across an opening in the container and into spaced inlet openings formed in a wall of a collection device;
   splitting said air flow before it reaches said openings and directing said air flow away from areas in between adjacent inlet openings and into said openings in the collection device; and
   entraining gaseous emissions discharged from the opening in the container within the laminar air flow so that the gaseous emissions enter the collection device through the openings with minimal turbulence through its inlet openings for disposition through an outlet of said collection device.

2. The method of collecting gaseous emissions from a container, comprising:

passing a flow of air across an opening in the container so that gaseous emissions discharged from the container are entrained within said air flow and drawn toward a series of spaced inlet openings formed in a wall of a collection device; and splitting said air flow before it reaches said openings and directing said air flow away from areas in between adjacent inlet openings and into said openings in the collection device so that a substantially laminar flow of air-entrained gaseous emission is introduced into the spaced inlet openings for disposition through an outlet of said collection device.

3. The method of claim 2 in which said step of directing said air flow comprises positioning an angled deflector member in the path of the air flow between adjacent inlet openings so that the air is smoothly guided into the inlet openings.

4. The method of claim 2 in which said step of passing a flow of air across an opening in the container comprises passing a flow of air across an opening in the container along a flow path which converges inwardly from an area located at least at the peripheral edge of the opening in the container, to the inlet openings formed in the collection device.

5. The method of claim 4 in which said step of passing a flow of air across an opening in the container comprises creating a negative pressure within the interior of the collection device so that air from outside the peripheral edge of the opening in the container, where the opening has its largest transverse dimension, is drawn inwardly across the opening and into the inlet openings of the collection device to prevent the escape of gaseous emissions along substantially the entire surface area of the opening in the container.

6. The method of collecting gaseous emissions from a container, comprising:

passing a flow of air across an opening in the container so that at least a portion of the gaseous emissions discharged from the container are entrained within said air flow and drawn into a series of spaced inlet openings formed in a wall of a collection device located proximate the container opening;

splitting said air flow before it reaches said openings and directing it away from any areas in between adjacent inlet openings and into said openings in the collection device so that a substantially laminar flow of air-entrained gaseous emissions is introduced into the spaced inlet openings; and directing at least another portion of gaseous emissions which initially fail to enter the inlet openings in the container into said substantially laminar flow of air-entrained gaseous emissions for entry into said inlet openings.

7. The method of claim 6 in which said step of directing the gaseous emissions which initially fail to enter the inlet openings comprises positioning a deflector member in the path of such gaseous emissions so that they are deflected into said substantially laminar flow of air-entrained gaseous emissions and directed toward the inlet openings in the collection device.

8. The method of collecting gaseous emissions from the open top of an adhesive supply container subsequent to removal of a feed ram from the interior of the container or before insertion of the feed ram into the container interior; comprising:

creating a flow of air along the top portion of the feed ram;

creating a relatively high velocity flow of air between the bottom of the feed ram and the open top of the container than along the top portion of the feed ram;

splitting portions of both the air flows before they reach said openings and directing the higher velocity air flow into spaced apart inlet openings of a collection device so that gaseous emissions discharged from the open top of the container are entrained within the air flow and are drawn into the inlet openings of the collection device with a substantially laminar flow for disposition through an outlet of a collection device.

9. Apparatus for collecting gaseous material emitted from an opening in a container, comprising:

a collector body for mounting in the proximity of the opening in the container, said collector body being formed with an inner wall, an outer wall, a top wall, a bottom wall and opposed end walls which collectively define a hollow interior, said inner wall being formed with inlet openings which are spaced from one another in a direction from one of said end walls to the other, said collector body having an outlet for connection to a source of vacuum which creates a negative pressure within said hollow interior to draw an air flow across the opening in the container toward said inlet openings in said collector body when said collector body is mounted in the proximity of the container;

first deflector means carried by said inner wall of said collector body for directing said air flow into said inlet openings so that gaseous material emitted from the container is entrained within said air flow and smoothly drawn in a substantially laminar flow through said inlet openings and into said collector body;

second deflector means carried by said collector body in the path of gaseous material flowing in a direction away from said inlet openings toward said top wall for directing such gaseous material into said laminar air flow entering said inlet openings.

10. The apparatus of claim 9 in which said first deflector means comprises a strake mounted to said inner wall of said collector body at each of said spaces between adjacent inlet openings, each of said strakes including a leading edge spaced outwardly from said inner wall and a pair of tapered side walls each extending from said leading edge to said inner wall of said collector body.

11. The apparatus of claim 9 in which said second deflector means comprises a plate mounted to said collector body near said top wall thereof which extends outwardly from and substantially perpendicular to said inner wall.

12. The apparatus of claim 9 in which the container is cylindrical in shape with an open top having a circular peripheral edge, said means for developing a flow of air across the opening in the container including an arc-shaped inner wall of said collector body, which, with said collector body mounted proximate the container, conforms to less than about 180° of the circular peripheral edge of the open top of the container, said inlet openings in said arc-shaped inner wall of said collector body being located between a pair of parallel lines which are tangent to said circular peripheral edge of the container.

13. Apparatus for collecting gaseous material emitted from an opening in a container, comprising:

a collector body for mounting in the proximity of the opening in the container, said collector body being formed with an inner wall, an outer wall, a top wall, a bottom wall and opposed end walls which collectively define a hollow interior, said inner wall being formed with inlet openings which are spaced from one another in a direction from one of said end walls to the other, said collector body having an outlet for connection to a source of vacuum which creates a negative pressure within said hollow interior to draw an air flow across the opening in the container toward said inlet openings in said collector body when said collector body is mounted in the proximity of the container;

first deflector means carried by said inner wall of said collector body for directing said air flow into said inlet openings so that gaseous material emitted from the container is entrained within said air flow and smoothly drawn in a substantially laminar flow through said inlet openings and into said collector body;

second deflector means carried by said collector body in the path of gaseous material flowing in a direction away from said inlet openings toward said top wall for directing such gaseous material into said laminar air flow entering said inlet openings;

third deflector means carried by said deflector body for substantially blocking the flow of air from outside of the container in a direction from said bottom wall of said deflector body toward said inlet openings.

14. The apparatus of claim 13 in which said third deflector means comprises a plate mounted to said bottom wall of said collector body and extending outwardly relative to said inner wall thereof.

15. Apparatus for collecting gaseous material emitted from an opening in a container, comprising:

a collector body for mounting in the proximity of the opening in the container, said collector body being formed with an inner wall, an outer wall, a top wall, a bottom wall and opposed end walls which collectively define a hollow interior, said inner wall being formed with inlet openings which are spaced from one another in a direction from one of said end walls to the other, said collector body having an outlet for connection to a source of vacuum which creates a negative pressure within said hollow interior to draw an air flow across the opening in the container toward said inlet openings in said collector body when said collector body is mounted in the proximity of the container;

a strake mounted to said inner wall of said collector body at said spaces between adjacent inlet openings, each of said strakes including a leading edge spaced outwardly from said inner wall and a pair of tapered side walls each extending from said leading edge to said inner wall of said collector body, said strakes being effective to direct said air flow into said inlet openings so that gaseous material emitted from the container is entrained within said air flow and smoothly drawn in a substantially laminar flow through said inlet openings and into said collector body.

16. The apparatus of claim 15 in which the opening in the container has a periphery, said inlet openings being formed in said collector body so that they are located between a pair of parallel lines which are tangent to the periphery of the container opening at its largest transverse dimension when said collector body is mounted in the proximity of the opening in the container.

17. The apparatus of claim 15 in which the container is cylindrical in shape with an open top having a circular peripheral edge and a diameter, said collector body having an arc-shaped inner wall which conforms to less than about 180° of the circular peripheral edge of the open top of the container with said collector body mounted in proximity thereto, said inlet openings being located in said collector body between a pair of parallel lines which are tangent to said circular peripheral edge of the container.

18. The apparatus of claim 15 in which said leading edge of each of said strakes tapers inwardly relative to said inner wall of said collector body in a direction from said top wall of said collector body toward said bottom wall thereof.

19. The apparatus of claim 15 in which each of said strakes is formed with a wider, base portion located near said top wall of said collector body and a narrower, apex portion located near said bottom wall of said collector body.

20. The apparatus of claim 19 in which each of said spaces on said inner wall between adjacent strakes is triangular in shape having a wider base portion located near said bottom wall of said collector body and a narrower, apex portion located near said top wall thereof, said inlet openings being formed in pairs along said inner wall within said triangular-shaped spaces between adjacent strakes wherein one inlet opening of each pair is located vertically above the other.

* * * * *